United States Patent [19]

Yamashita

[11] Patent Number: 5,615,256
[45] Date of Patent: Mar. 25, 1997

[54] DEVICE AND METHOD FOR AUTOMATICALLY CONTROLLING SOUND VOLUME IN A COMMUNICATION APPARATUS

[75] Inventor: Osamu Yamashita, Tokyo, Japan

[73] Assignee: NEC Corporation, Japan

[21] Appl. No.: 440,781

[22] Filed: May 15, 1995

[30] Foreign Application Priority Data

May 13, 1994 [JP] Japan ..................................... 6-123307

[51] Int. Cl.$^6$ .............. H04M 9/08; H03G 3/20; H03G 3/00
[52] U.S. Cl. ................ 379/390; 379/388; 381/57; 381/104; 381/107
[58] Field of Search .................... 379/388, 389, 379/390, 392, 420, 409, 395; 381/104, 107, 108, 94, 57

[56] References Cited

U.S. PATENT DOCUMENTS

| | | | |
|---|---|---|---|
| 3,889,059 | 6/1975 | Thompson et al. | 379/390 |
| 4,147,892 | 4/1979 | Miller | 379/389 |
| 4,700,382 | 10/1987 | Means et al. | 379/388 X |
| 4,829,565 | 5/1989 | Goldberg | 379/390 |
| 4,847,897 | 7/1989 | Means | 379/390 |
| 4,891,837 | 1/1990 | Walker et al. | 379/388 X |
| 5,170,499 | 12/1992 | Grothause | 381/57 X |
| 5,297,198 | 3/1994 | Butani et al. | 379/389 |
| 5,357,567 | 10/1994 | Barron et al. | 379/390 |
| 5,398,281 | 3/1995 | Kurokawa et al. | 379/388 X |
| 5,406,622 | 4/1995 | Silverberg et al. | 379/392 X |
| 5,450,494 | 9/1995 | Okubo et al. | 381/57 |
| 5,471,528 | 11/1995 | Reesor | 379/388 X |
| 5,479,476 | 12/1995 | Finke-Anlauff | 379/58 |
| 5,548,638 | 8/1996 | Yamaguchi et al. | 379/409 X |

FOREIGN PATENT DOCUMENTS

| | | |
|---|---|---|
| 2-250455 | 10/1990 | Japan . |
| 4-82331 | 3/1992 | Japan . |
| WO93/06679 | 4/1993 | WIPO . |

*Primary Examiner*—Ahmad F. Matar
*Assistant Examiner*—Devendra T. Kumar
*Attorney, Agent, or Firm*—Ostrolenk, Faber, Gerb & Soffen, LLP

[57] ABSTRACT

A communication apparatus comprises a sound volume controller in which a speech signal is discriminated from background noise of a transmitting audio signal and the sound volume control is performed when no speech signal is present in the transmitting audio signal. The sound volume controller comprises an averaging circuit for averaging an amplitude of the transmitting audio signal, a discriminator for discriminating a speech signal of the transmitting audio signal by comparing the transmitting audio signal with the averaged amplitude, and a controller for controlling an amplitude of a receiving audio signal when no speech signal is present in the transmitting audio signal. A level of the averaged amplitude is determined by comparing the averaged amplitude with at least one predetermined reference level, and the amplitude of the receiving audio signal is varied according to the level of the averaged amplitude when no speech signal is present.

22 Claims, 8 Drawing Sheets

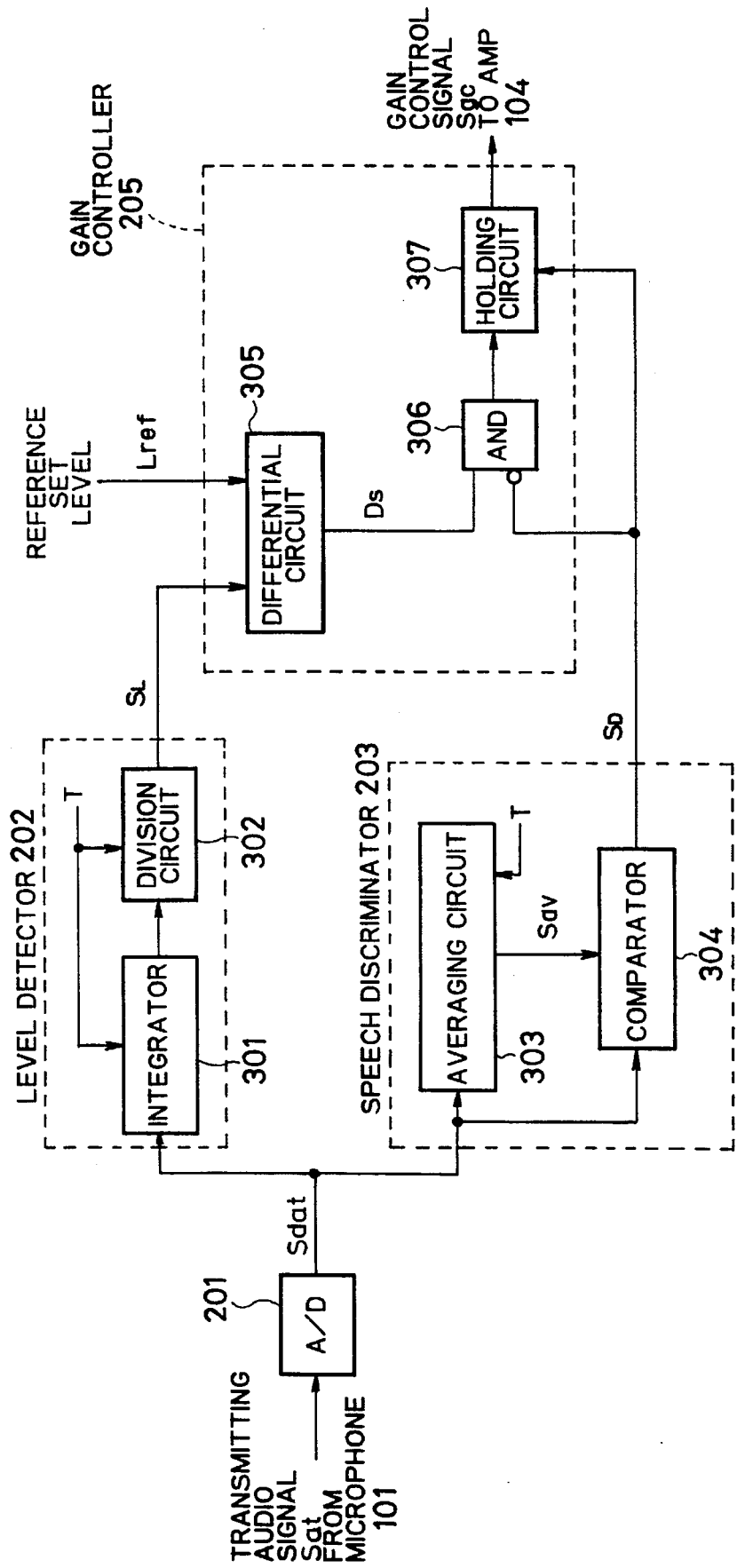

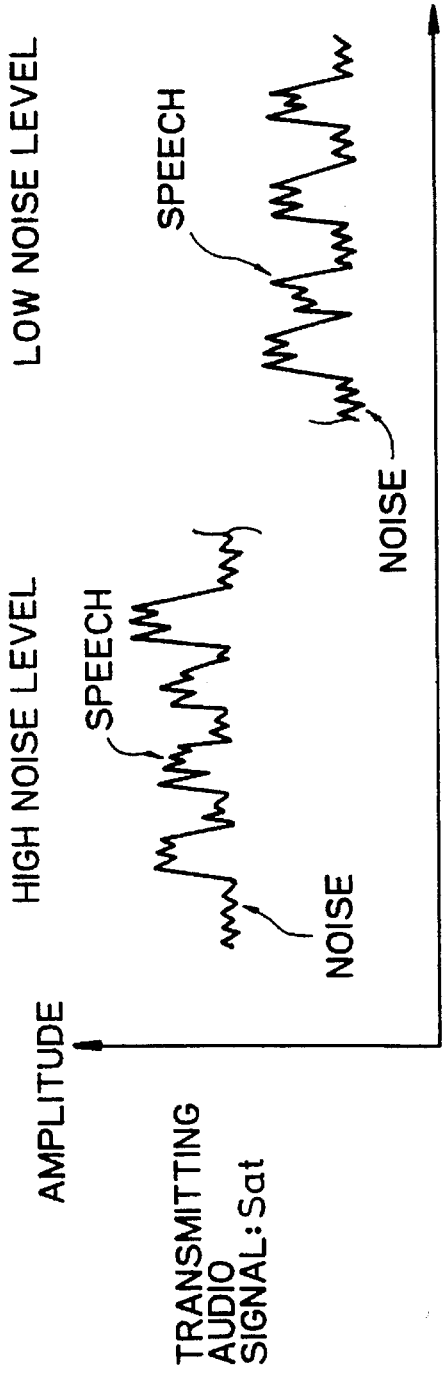
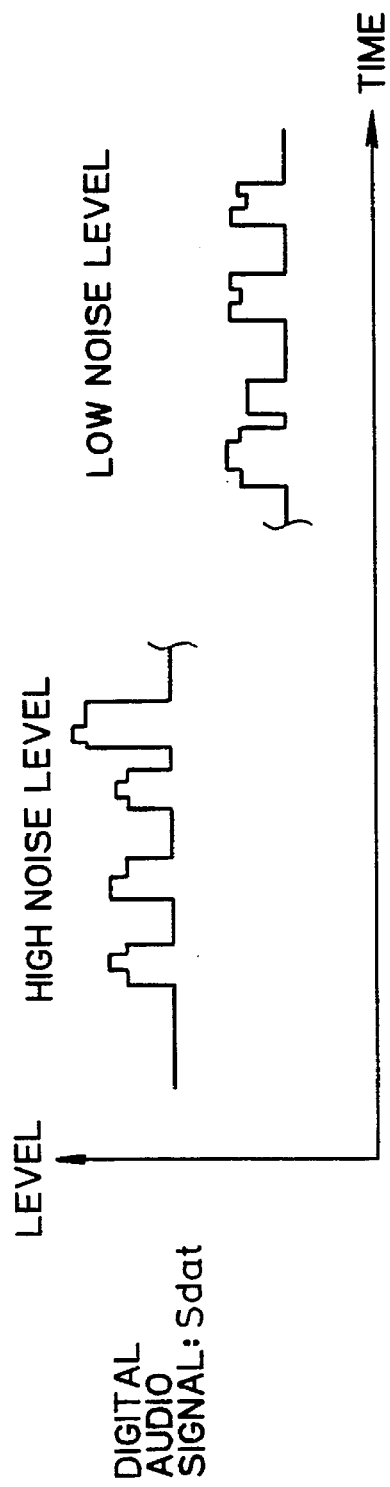

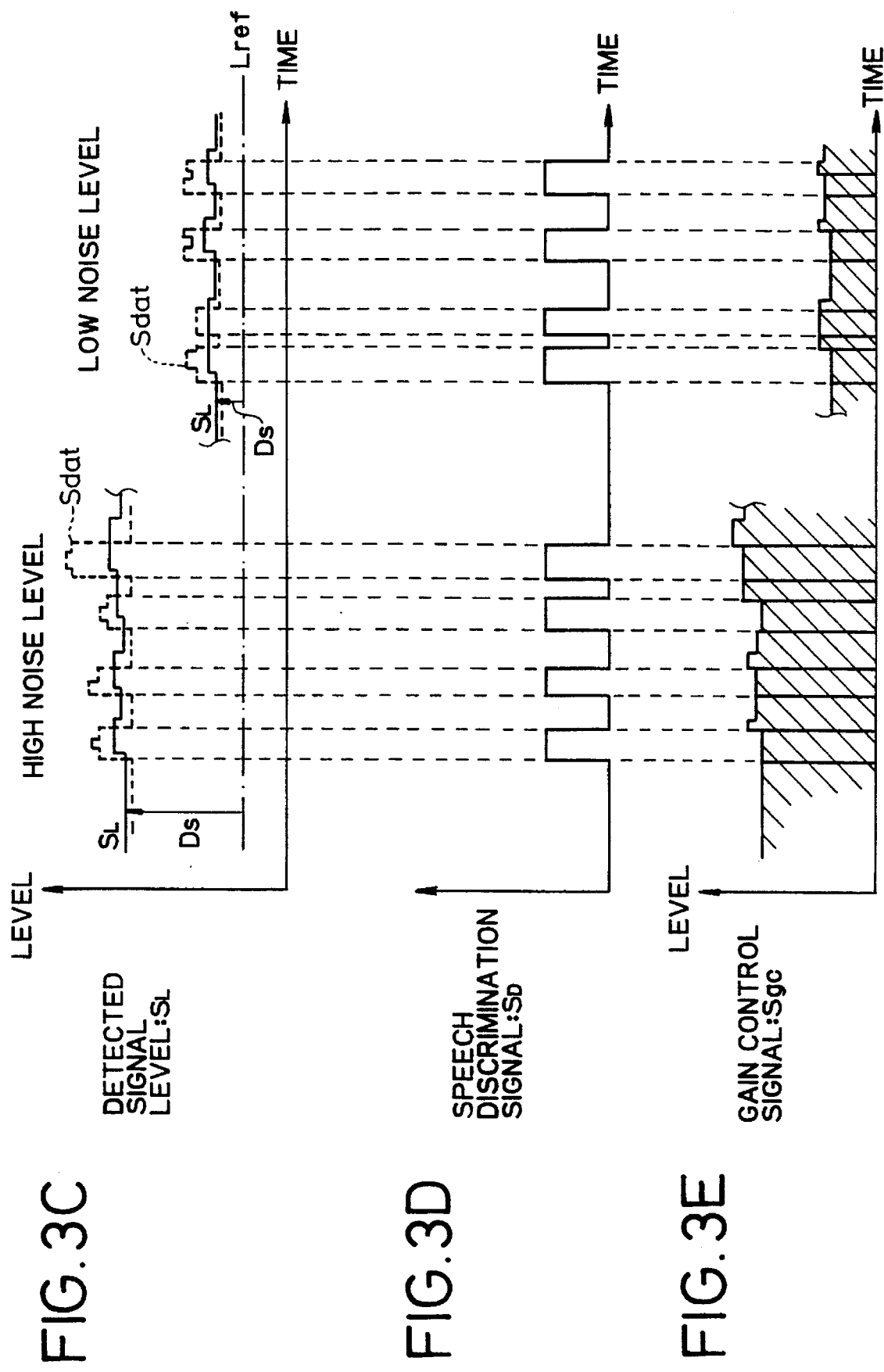

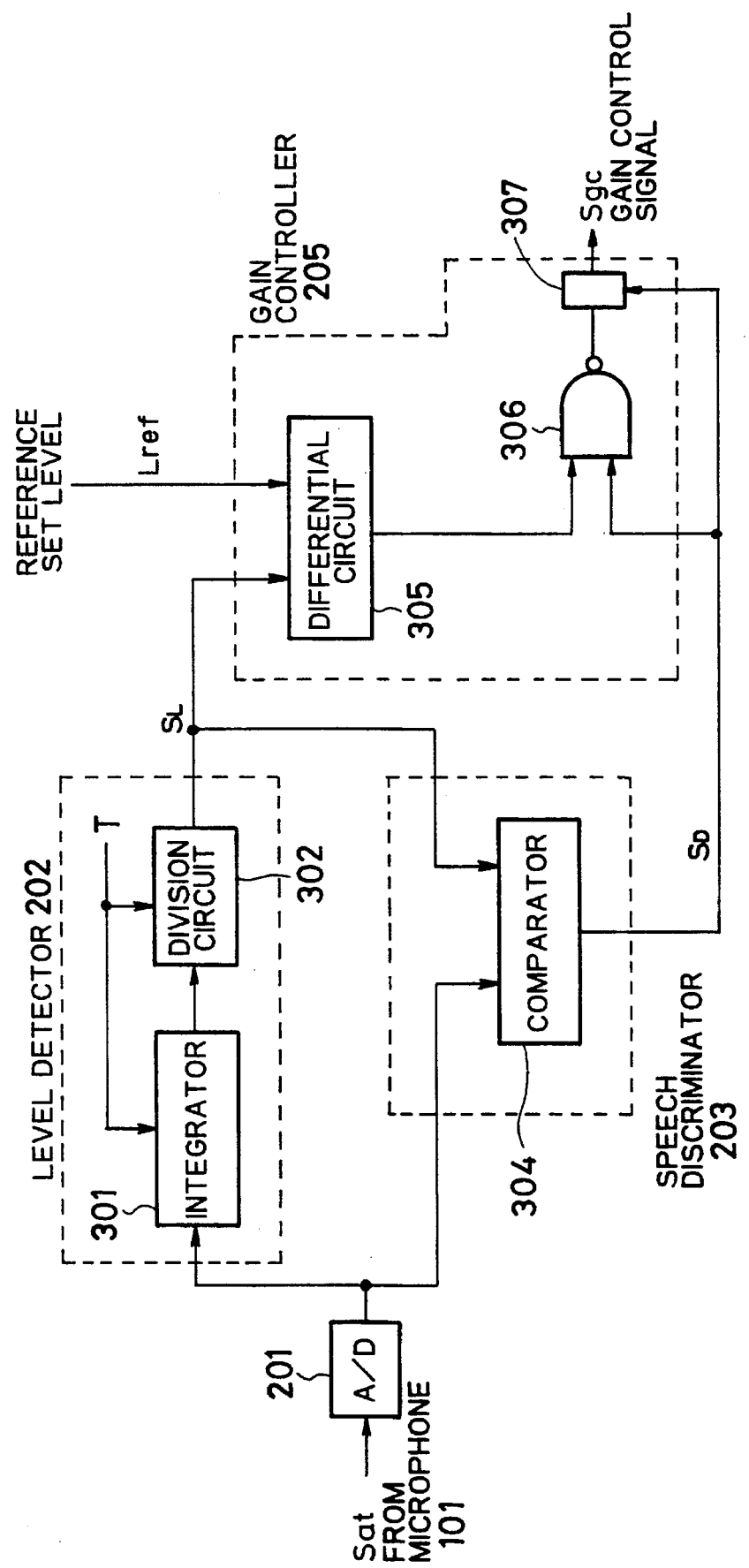

5,615,256

DEVICE AND METHOD FOR AUTOMATICALLY CONTROLLING SOUND VOLUME IN A COMMUNICATION APPARATUS

BACKGROUND OF THE INVENTION

1. Field of the Invention

The present invention relates to communication apparatuses such as a portable radio apparatus capable of transmitting and receiving an audio signal, and more particularly to a communication apparatus in which a sound level of a speaker can be automatically adjusted according to a surrounding noise.

2. Prior Art

Recently, a portable telephone set has been widespread with progressed mobile radio communication, and people have come to easily talk over the telephone at any place as well as specific places such as a telephone booth, etc. This is an important feature of the mobile radio telephone system. However, a noise problem arises in cases where the telephone is used in noisy surroundings.

In Japanese Patent Laid-open Publication No. HEI 4-82331 (publication date: Mar. 16, 1992), a portable telephone set is provided with a microphone for detecting a surrounding noise. The surrounding noise level detected by the microphone is compared with a reference level, and based on a result of the comparison, a sound volume is controlled according to the surrounding noise level so that a receiving speech can easily be heard.

In another telephone set disclosed in Japanese Patent Laid-Open Publication No. HEI 2-250455 (publication date: Oct. 8, 1990), a telephone transmitter is used to detect a surrounding noise, and the sound volume of a telephone receiver is controlled according to the surrounding noise level. In this telephone set, the surrounding noise level is detected from a transmitting signal including a transmission speech signal and a surrounding noise. Therefore, a transmitting signal is recognized as a surrounding noise when the telephone set is in its on-hook state where there is no transmission speech, and the sound volume is regulated according to the surrounding noise.

However, in the portable telephone set disclosed in the former publication (HEI 4-82331), since the noise detecting microphone is needed in addition to a telephone transmitter and a telephone receiver, the number of parts is increased and an extra space for providing the noise detecting microphone is needed. Therefore, it is not preferable that such a microphone used only to detect a surrounding noise is provided in a portable telephone set which is required to be reduced in size.

In the other telephone set disclosed in the latter publication (HEI 2-250455), the telephone transmitter is used to detect a surrounding noise, so the telephone set can be applied to a small-size communication device. However, since the surrounding noise is detected at the on-hook state and the sound volume is regulated based on the level of this detected noise, the sound volume cannot be regulated according to the surrounding noise at the off-hook state when taking is actually performed. Therefore, even if the level of the surrounding noise changes during talking, the sound volume is fixed at a certain level which was set while on-hook, causing a problem that the receiving speech sound is difficultly heard in noisy surroundings.

SUMMARY OF THE INVENTION

An object of the present invention is to provide a small-size communication apparatus capable of obtaining sufficient speech quality even in noisy surroundings.

Another object of the present invention is to provide a communication apparatus capable of effectively dealing with noisy surroundings changing in noise level.

Still another object of the present invention is to provide a sound volume control device and method which automatically controls the gain of an audio amplifier according to a surrounding noise level.

A communication apparatus according to the present invention is comprised of a sound volume controller in which a speech signal is discriminated from background noise of a transmitting audio signal and the sound volume control is performed when no speech signal is present in the transmitting audio signal. More specifically, the sound volume controller is comprised of an averaging circuit for averaging an amplitude of the transmitting audio signal, a discriminator for discriminating a speech signal of the transmitting audio signal by comparing the transmitting audio signal with the averaged amplitude of the transmitting audio signal, and a controller for controlling an amplitude of a receiving audio signal when no speech signal is present in the transmitting audio signal. Since the speech signal is discriminated by comparing the transmitting audio signal with the averaged amplitude of the same, automatic sound volume control can be performed during talking.

The communication apparatus is further comprised of a determination circuit which determines a level of the averaged amplitude by comparing the averaged amplitude with at least one predetermined reference level, and the amplitude of the receiving audio signal is varied according to the level of the averaged amplitude when no speech signal is present. Therefore, when the surrounding noise is higher than the reference level, the receiving audio signal is amplified to increase the sound volume such that the user can clearly hear the receiving speech regardless of the surrounding noise level. When, on the other hand, the level of the surrounding noise is low, the sound volume is set to a predetermined level required for hearing clearly.

Preferably, the determination circuit comprises a differential circuit which detects a level difference between the averaged amplitude and the predetermined reference level. According to the level difference, the controller varies the amplitude of the receiving audio signal when no speech signal is present. The level of the averaged amplitude may be determined by comparing the averaged amplitude with a plurality of predetermined reference levels. Since the amplitude of the receiving audio signal is adjusted according to the level difference between the averaged amplitude and the predetermined reference level, the sound volume control is automatically performed according to a surrounding noise level.

As described above, the sound volume of the reception speech can be regulated at all times appropriately in accordance with a change in a surrounding noise during talking. Therefore, there is no need for the user to manually regulate the sound volume of a reception speech, resulting in improved operation of the portable communication apparatus.

BRIEF DESCRIPTION OF THE DRAWINGS

The above and other objects and advantages will become apparent from the following detailed description when read in conjunction with the accompanying drawings wherein:

FIG. 2 is a block diagram showing a sound volume controller of the first embodiment;

FIG. 3A is a waveform diagram showing transmitting audio signals in the first embodiment;

FIG. 3B is a level diagram showing digital audio signals in the first embodiment;

FIG. 3C is a level diagram showing detected signal levels of the transmitting audio signals in the first embodiment;

FIG. 3D is a waveform diagram showing speech discrimination signals in the first embodiment;

FIG. 3E is a level diagram showing a gain control signal in the first embodiment;

FIG. 4 is a block diagram showing a sound volume controller of a second embodiment according to the present invention;

DETAILED DESCRIPTION OF THE PREFERRED EMBODIMENTS

Figure 1:
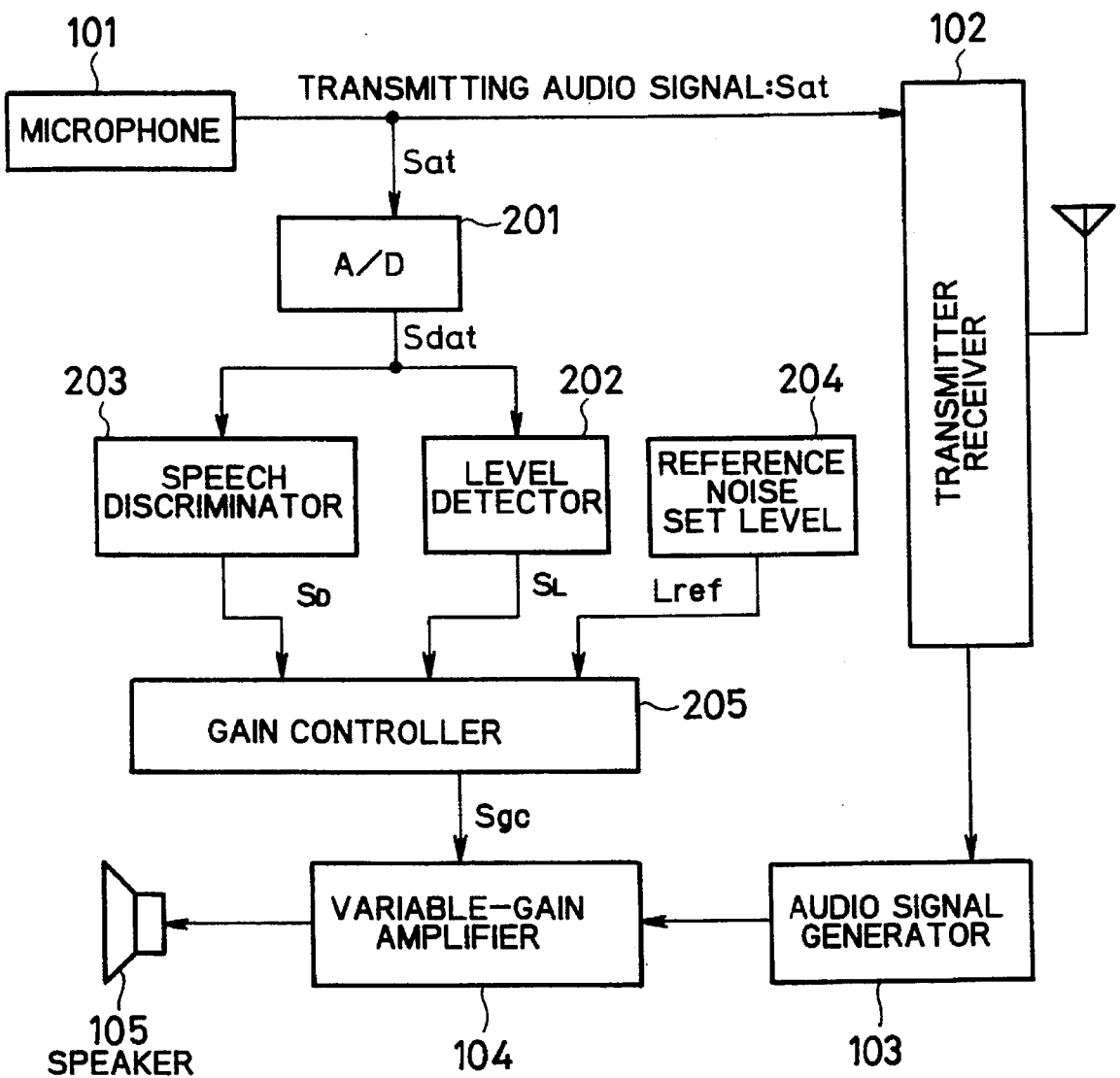
FIG. 1 is a block diagram illustrating a schematic circuit configuration of a first embodiment of the present invention.

Several embodiments according to the present invention are explained hereinafter in detail referring to the drawings.

FIRST EMBODIMENT

Referring to FIG. 1, there is shown a portable radio telephone set to which the present invention may be applied. A microphone 101 outputs a transmitting audio signal Sat to a transmitter/receiver 102 where the transmitting audio signal Sat modulates a radio frequency carrier wave to be transmitted through an antenna. On the other hand, a radio wave is received by the transmitter/receiver 102 through the antenna and is demodulated to a baseband signal. Inputting the baseband signal, an audio signal generator 103 generates an audio signal to output it to a variable-gain amplifier 104. The variable-gain amplifier 104, as known well, has a gain switching function according to a gain control signal Sgc. The audio signal amplified by the variable-gain amplifier 104 is converted to a sound wave by a speaker 105.

A sound volume controller according to the present invention outputs the gain control signal Sgc based on the transmitting audio signal Sat. More specifically, the sound volume controller is comprised of an analog-to-digital (A/D) converter 201, a level detector 202, a speech discriminator 203, a reference level memory 204, and a gain controller 205. The A/D converter 201 converts the transmitting audio signal Sat into a digital audio signal Sdat to output it to the level detector 202 and the speech discriminator 203.

The level detector 202 detects a signal level $S_L$ from the digital audio signal Sdat to output it to the gain controller 205. The speech discriminator 203 discriminates between speech and background noise to output a speech discrimination signal $S_D$ to the gain controller 205. The reference level memory 204 stores at least one reference noise set level $L_{ref}$ which is read out to the gain controller 205.

The gain controller 205 first compares the signal level $S_L$ to the reference noise set level $L_{ref}$ to determine whether the signal level $S_L$ is greater than the reference noise set level $L_{ref}$. If the signal level $S_L$ is not smaller than the reference noise set level $L_{ref}$, the gain controller 205 calculates a level difference between the signal level $S_L$ and the reference noise set level $L_{ref}$. The gain controller 205 outputs the level difference as the gain control signal Sgc according to the speech discrimination signal $S_D$. If the signal level $S_L$ is smaller than the reference noise set level $L_{ref}$, the gain controller 205 generates a constant level required for easily hearing the receiving speech and outputs the constant level as the gain control signal Sgc according to the speech discrimination signal $S_D$. Therefore, the gain controller 205 controls the variable-gain amplifier 104 such that the gain of the amplifier 104 is changed according to the gain control signal Sgc. In other words, the sound volume of the speaker 105 is adjusted each time the speech discriminator 203 discriminates the background noise from the digital audio signal Sdat.

The level detector 202, the speech discriminator 203 and the gain controller 205 may be comprised of a micro processor which performs the above-mentioned sound volume control using a software program.

As illustrated in FIG. 2, the sound volume controller can be realized simply. In this example of the sound volume controller, the level detector 202 may be comprised of an integrator 301 and a division circuit 302 which are connected such that the amplitude of the transmitting audio signal Sat is averaged. The integrator 301 integrates the digital audio signal Sdat over an integration period (T) and the division circuit 302 divides the integrated signal by the time interval (T) to obtain an average level $S_L$.

The speech discriminator 203 is comprised of an averaging circuit 303 and a comparator 304. Receiving the digital audio signal Sdat, the averaging circuit 303 calculates an average amplitude Sav of the digital audio signal Sat. The averaging circuit 303 may employ the same circuit as the level detector 202.

The comparator 304 compares the digital audio signal Sat to the average amplitude Sav. If the digital audio signal Sat is greater than the average amplitude Sav, the comparator 304 outputs a speech discrimination signal $S_D$ of value '1' indicating 'speech', and if the digital audio signal Sat is not greater than the average amplitude Sav, the comparator 304 outputs a speech discrimination signal $S_D$ of value '0' indicating 'noise'.

The gain controller 205 may be comprised of a differential circuit 305, a logical AND gate 306 and a holding circuit 307. The differential circuit 305 receives the signal level $S_L$ from the level detector 202 and the reference set level $L_{ref}$ from the reference level memory 204 and calculates a level difference Ds between them. The logical AND gate 306 receives the speech discrimination signal $S_D$ and the level difference Ds. Therefore, the level difference Ds is output to the holding circuit 307 when no speech signal is present in the audio signal. The holding circuit 307 holds a digital value of the level difference Ds when a speech signal is present.

The operation of the sound volume controller as shown in FIG. 2 will hereinafter be described more specifically.

As shown in FIG. 3A, assuming that a transmitting audio signal Sat has a wave form including a background noise region indicated by 'Noise' and a speech region indicated by 'Speech'. Since the voice of a user is directly input to the microphone 101 of the telephone set, the amplitude of the speech region is larger than that of the background noise region. Therefore, the A/D converter 201 outputs the digital audio signal Sdat which is schematically shown in FIG. 3B where the vertical axis indicates the amplitude level of the digital audio signal Sdat.

Referring to FIG. 3C, the level detector 202 calculates the signal level $S_L$ by averaging the digital audio signal Sdat. The signal level $S_L$ is compared to the reference set level $L_{ref}$ by the differential circuit 305 to obtain the level difference Ds.

The speech discriminator 203 calculates the averaged level Sav and compares the digital audio signal Sdat to the averaged level Sav to output the speech discrimination signal $S_D$ as shown in FIG. 3D. If the averaging circuit 303 employs the same circuit as the level detector 202, the averaged level Sav is the signal level $S_L$. Therefore, as shown in FIGS. 3C and 3D, the digital audio signal Sdat is compared to the signal level $S_L$ to generate the speech discrimination signal $S_D$.

The speech discrimination signal $S_D$ and the level difference Ds are input to the AND gate 306, and then the output of the AND gate 306 is input to the holding circuit 307 where the gain control signal Sgc is obtained as shown in FIG. 3E. More specifically, when the speech discrimination signal $S_D$ is in logical high, that is, in speech state, the level difference Ds cannot pass through the AND gate 306. In contrast, when the speech discrimination signal $S_D$ is in logical low, that is, in the 'Noise' state, the level difference Ds passes through the AND gate 306 and is output to the holding circuit 307. The holding circuit 307 holds a digital value of the level difference Ds in the 'Speech' state. Therefore, according to the magnitude of the level difference Ds, the variable-gain amplifier 104 varies in gain.

SECOND EMBODIMENT

Referring to FIG. 4, in which functional blocks similar to those previously described with reference to FIG. 2 are denoted by the same reference number, the speech discriminator 203 may be comprised of the comparator 304 only. Since the signal level $S_L$ obtained by the level detector 202 can be used as the averaged signal Sav of the averaging circuit 303, the comparator 304 is capable of calculating the speech discrimination signal $S_D$ using the digital audio signal Sdat and the signal level $S_L$.

It should be noted that the sound volume controller as shown in FIG. 4 may be comprised of a micro processor which performs the above-mentioned sound volume control using a software program.

THIRD EMBODIMENT

Figure 5:
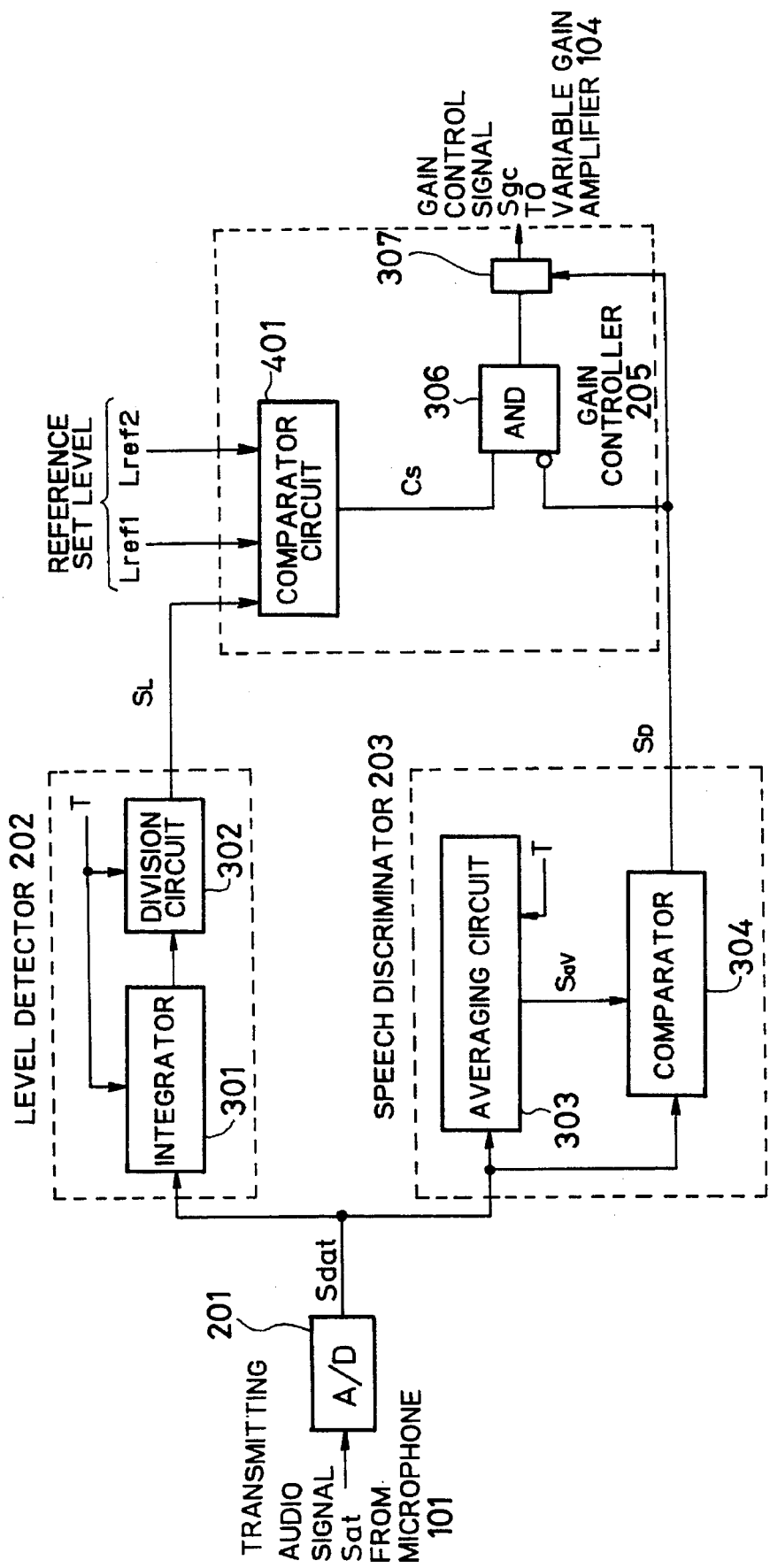
FIG. 5 is a block diagram showing a sound volume controller of a third embodiment according to the present invention.

Referring to FIG. 5, in which functional blocks similar to those previously described with reference to FIG. 2 are denoted by the same reference number, the gain controller 205 may be comprised of a comparator circuit 401, the logical AND gate 306 and the holding circuit 307. The comparator circuit 401 compares the signal level $S_L$ with two reference set levels $L_{ref1}$ and $L_{ref2}$, and outputs a control signal Cs.

Figures 6A, 6B, 6C:
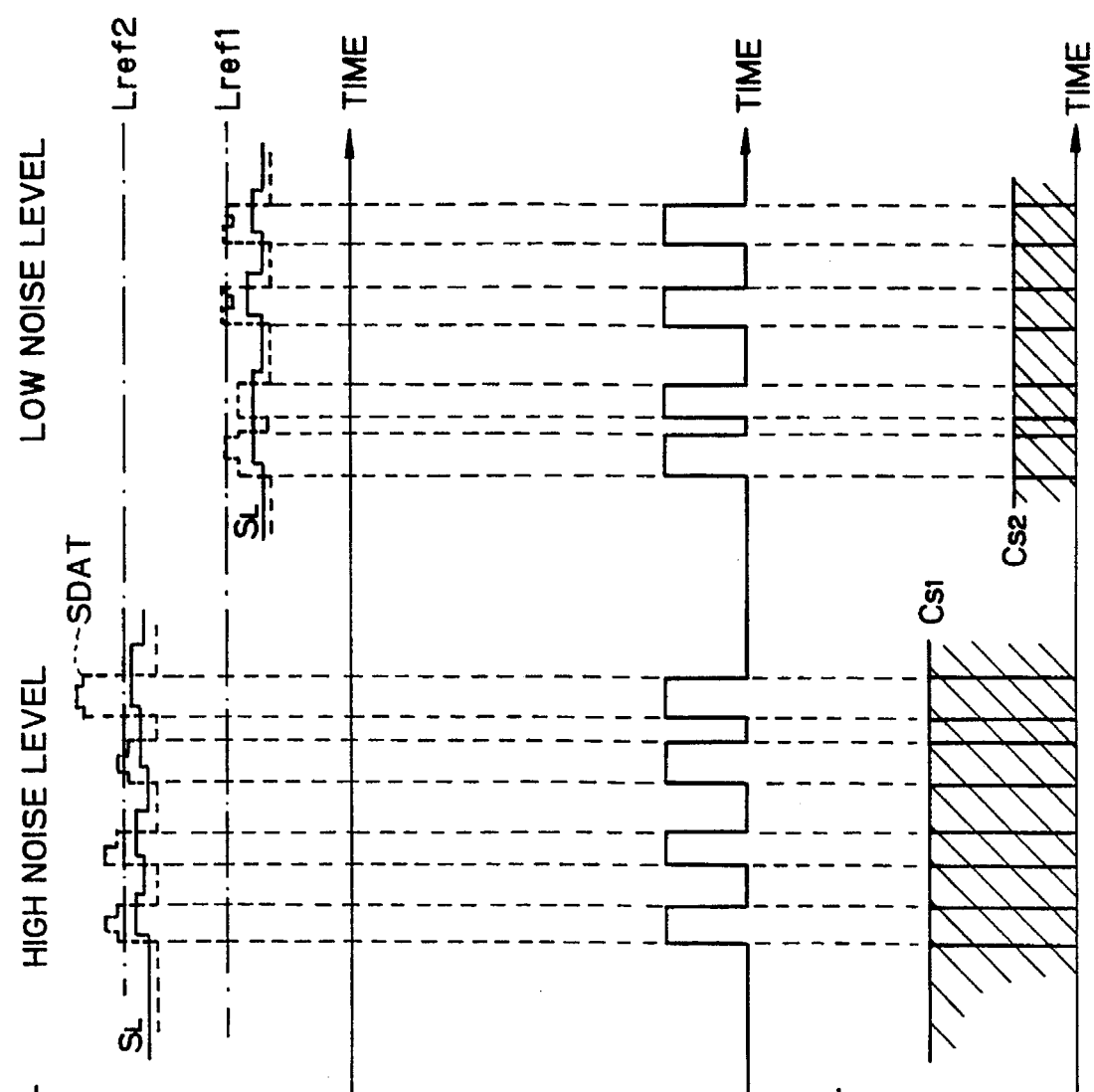
FIG. 6A is a level diagram showing detected signal levels of the transmitting audio signals in the third embodiment.
FIG. 6B is a waveform diagram showing speech discrimination signals in the third embodiment.
FIG. 6C is a level diagram showing a gain control signal in the third embodiment.

More specifically, as shown in FIG. 6A, the two different reference levels $L_{ref1}$ and $L_{ref2}$ are used to determine the magnitude of the signal level $S_L$. When the signal level $S_L$ falls into the range between the reference levels $L_{ref1}$ and $L_{ref2}$ in high noise level surroundings, the comparator circuit 401 outputs a control signal $C_{s1}$ having a higher value. When the signal level $S_L$ is smaller than the reference level $L_{ref1}$ in low noise level surroundings, the comparator circuit 401 outputs a control signal $C_{s2}$ having a lower value. Therefore, according to the speech discrimination signal $S_D$, the holding circuit 307 outputs a gain control signal Sgc having a different value, as shown in FIG. 6C.

In this embodiment, although two reference noise set levels $L_{ref1}$ and $L_{ref2}$ are employed, two or more reference levels may be used easily. In such a case, suitable reception of a speech becomes possible even when a surrounding noise greatly changes.

It should be noted that the sound volume controller as shown in FIG. 5 may be comprised of a micro processor which performs the above-mentioned sound volume control using a software program.

FOURTH EMBODIMENT

Figure 7:
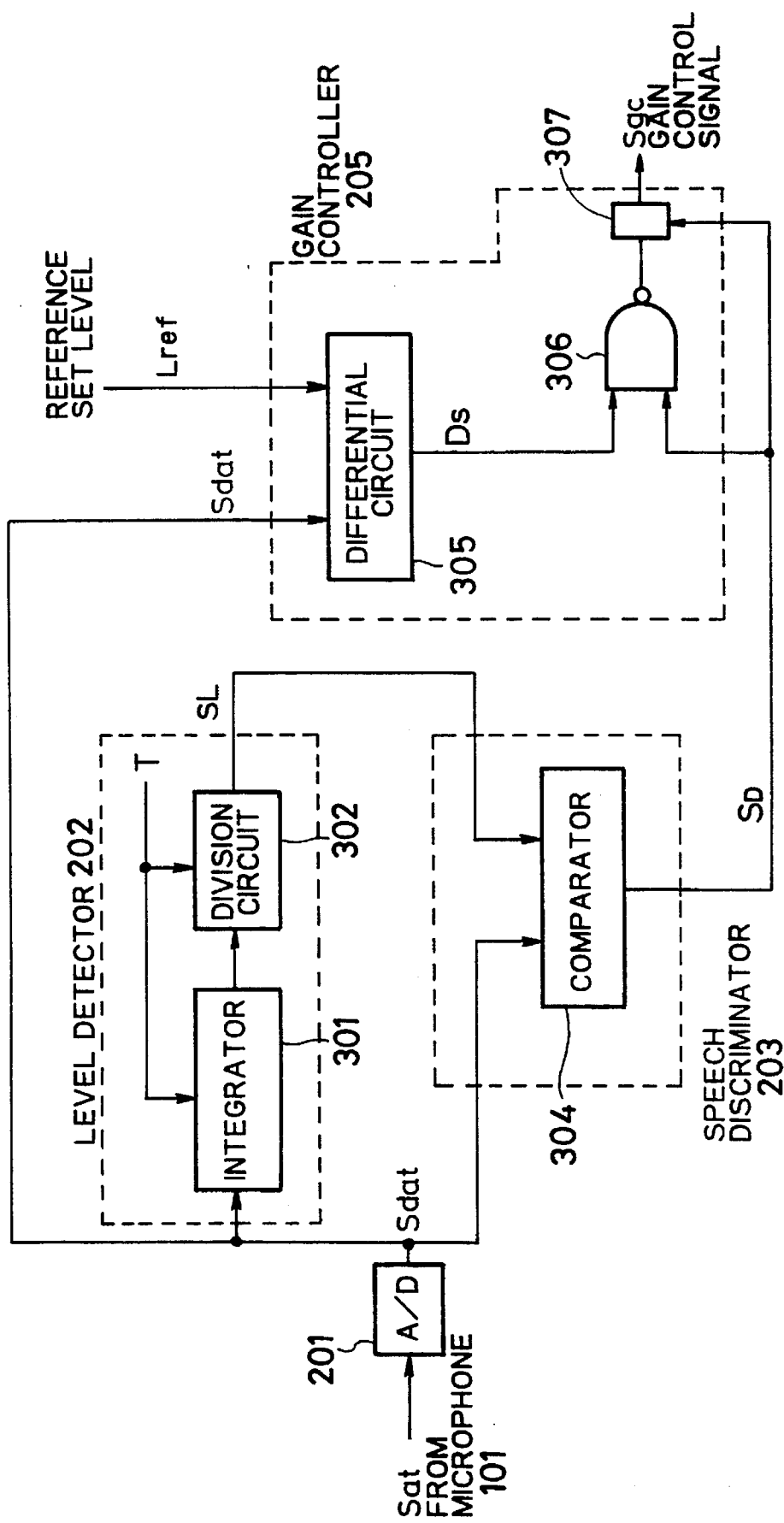
FIG. 7 is a block diagram showing a sound volume controller of a fourth embodiment according to the present invention.

Referring to FIG. 7, in which functional blocks similar to those previously described with reference to FIG. 2 are denoted by the same reference number, the differential circuit 305 inputs the digital audio signal Sdat and the reference set level $L_{ref}$ to output the level difference Ds. Therefore, the magnitude of the level difference Ds is increased in a 'Speech' state. However, since the level difference Ds does not pass through a NAND gate 306 in a 'Speech' state, the gain control signal Sgc can be adjusted only in the 'Noise' state with reflecting an actual noise level of the digital audio signal Sdat.

It should be noted that the above-mentioned embodiments can be realized with software programs executed by a microcomputer that is incorporated in the communication device.

What is claimed is:

1. A communication apparatus comprising:

first means for converting a first sound wave to a first audio signal;

second means for converting a second audio signal to a second sound wave;

averaging means for averaging an amplitude of the first audio signal to obtain an averaged amplitude of the first audio signal;

discriminating means for discriminating a speech signal of the first audio signal by comparing the first audio signal with the averaged amplitude of the first audio signal;

determination means for determining a level of the averaged amplitude by comparing the averaged amplitude with at least one predetermined reference level; and control means for varying an amplitude of the second audio signal according to the level of the averaged amplitude when the speech signal is not present in the first audio signal, wherein the discriminating means comprises a comparator for comparing the first audio signal with the averaged amplitude of the first audio signal, the comparator outputting a speech discrimination signal when an amplitude of the first audio signal is greater than the averaged amplitude of the first audio signal, and the comparator outputting a non-speech discrimination signal when an amplitude of the first audio signal is not greater than the averaged amplitude of the first audio signal.

2. The communication apparatus according to claim 1, wherein the control means comprises:

volume varying means for varying the amplitude of the second audio signal according to a gain control signal; and gain control means for outputting the gain control signal to the volume varying means, the gain control signal causing the volume varying means to vary the amplitude of the second audio signal when the gain control means receives the non-speech discrimination signal from the discriminating means.

3. The communication apparatus according to claim 1, wherein the communication apparatus is a voice communication apparatus.

4. The communication apparatus according to claim 1, wherein the communication apparatus is a portable telephone set.

5. A communication apparatus comprising:

first means for converting a first sound wave to a first audio signal;

second means for converting a second audio signal to a second sound wave;

averaging means for averaging an amplitude of the first audio signal to obtain an averaged amplitude of the first audio signal;

discriminating means for discriminating a speech signal of the first audio signal by comparing the first audio signal with the averaged amplitude of the first audio signal;

determination means for determining a level of the first audio signal by comparing the first audio signal with at least one predetermined reference level; and control means for varying an amplitude of the second audio signal according to the level of the first audio signal when the speech signal is not present in the first audio signal.

6. The communication apparatus according to claim 5, wherein the determination means comprises a differential means for detecting a level difference between the first audio signal and the predetermined reference level.

7. The communication apparatus according to claim 6, wherein the control means varies the amplitude of the second audio signal according to the level difference when the speech signal is not present in the first audio signal.

8. The communication apparatus according to claim 5, wherein the determination means determines the level of the first audio signal by comparing the first audio signal with a plurality of predetermined reference levels.

9. The communication apparatus according to claim 5, wherein the discriminating means comprises a comparator for comparing the first audio signal with the averaged amplitude of the first audio signal, the comparator outputting a speech discrimination signal when an amplitude of the first audio signal is greater than the averaged amplitude of the first audio signal, and the comparator outputting a non-speech discrimination signal when an amplitude of the first audio signal is not greater than the averaged amplitude of the first audio signal.

10. The communication apparatus according to claim 9, wherein the control means comprises:

volume varying means for varying the amplitude of the second audio signal according to a gain control signal; and gain control means for outputting the gain control signal to the volume varying means, the gain control signal causing the volume varying means to vary the amplitude of the second audio signal when the gain control means receives the non-speech discrimination signal from the discriminating means.

11. The communication apparatus according to claim 5, wherein the control means comprises:

volume varying means for varying the amplitude of the second audio signal according to a gain control signal; and gain control means for outputting the gain control signal to the volume varying means, the gain control signal causing the volume varying means to vary the amplitude of the second audio signal when the speech signal is not present in the first audio signal.

12. The communication apparatus according to claim 5, wherein the communication apparatus is a voice communication apparatus.

13. The communication apparatus according to claim 5, wherein the communication apparatus is a portable telephone set.

14. A method for controlling sound volume in a communication apparatus comprising a first means for converting a first sound wave to a first audio signal and a second means for converting a second audio signal to a second sound wave, the method comprising the steps of:

averaging an amplitude of the first audio signal to obtain an averaged amplitude of the first audio signal;

discriminating a speech signal of the first audio signal by comparing the first audio signal with the averaged amplitude of the first audio signal;

determining a level of the first audio signal by comparing the first audio signal with at least one predetermined reference level; and varying an amplitude of the second audio signal according to the level of the first audio signal when the speech signal is not present in the first audio signal.

15. The method according to claim 14, wherein the level of the first audio signal is determined by detecting a level difference between the first audio signal and the predetermined reference level.

16. The method according to claim 15, wherein the amplitude of the second audio signal is varied according to the level difference when the speech signal is not present in the first audio signal.

17. The method according to claim 14, wherein the level of the first audio signal is determined by comparing the first audio signal with a plurality of predetermined reference levels.

18. The method according to claim 14, wherein the communication apparatus is a voice communication apparatus.

19. The method according to claim 14, wherein the communication apparatus is a portable telephone set.

20. A communication apparatus comprising:

first converter to convert a first sound wave to a first audio signal;

second converter to convert a second audio signal to a second sound wave;

averaging device to average an amplitude of the first audio signal to obtain an averaged amplitude of the first audio signal;

discriminating device to discriminate a speech signal of the first audio signal by comparing the first audio signal with the averaged amplitude of the first audio signal;

determination device to determine a level of the averaged amplitude by comparing the averaged amplitude with at least one predetermined reference level; and controller to vary an amplitude of the second audio signal according to the level of the averaged amplitude when the speech signal is not present in the first audio signal, wherein the discriminating device includes a comparator for comparing the first audio signal with the averaged amplitude of the first audio signal, the comparator outputting a speech discrimination signal when an amplitude of the first audio signal is greater than the averaged amplitude of the first audio signal, and the comparator outputting a non-speech discrimination signal when an amplitude of the first audio signal is not greater than the averaged amplitude of the first audio signal.

21. A communication apparatus comprising:

first converter to convert a first sound wave to a first audio signal;

second converter to convert a second audio signal to a second sound wave;

averaging device to average an amplitude of the first audio signal to obtain an averaged amplitude of the first audio signal;

discriminating device to discriminate a speech signal of the first audio signal by comparing the first audio signal with the averaged amplitude of the first audio signal;

determination device to determine a level of the first audio signal by comparing the first audio signal with at least one predetermined reference level; and controller to vary an amplitude of the second audio signal according to the level of the first audio signal when the speech signal is not present in the first audio signal.

22. A method for controlling sound volume in a communication apparatus including a first converter to convert a first sound wave to a first audio signal and a second converter to convert a second audio signal to a second sound wave, the method comprising the steps of:

averaging an amplitude of the first audio signal to obtain an averaged amplitude of the first audio signal;

discriminating a speech signal of the first audio signal by comparing the first audio signal with the averaged amplitude of the first audio signal;

determining a level of the first audio signal by comparing the first audio signal with at least one predetermined reference level; and varying an amplitude of the second audio signal according to the level of the first audio signal when the speech signal is not present in the first audio signal.

* * * * *